Aug. 31, 1937.                W. R. MARTIN                2,091,764
                            PRESSURE DAMPENER
                         Original Filed Jan. 23, 1931
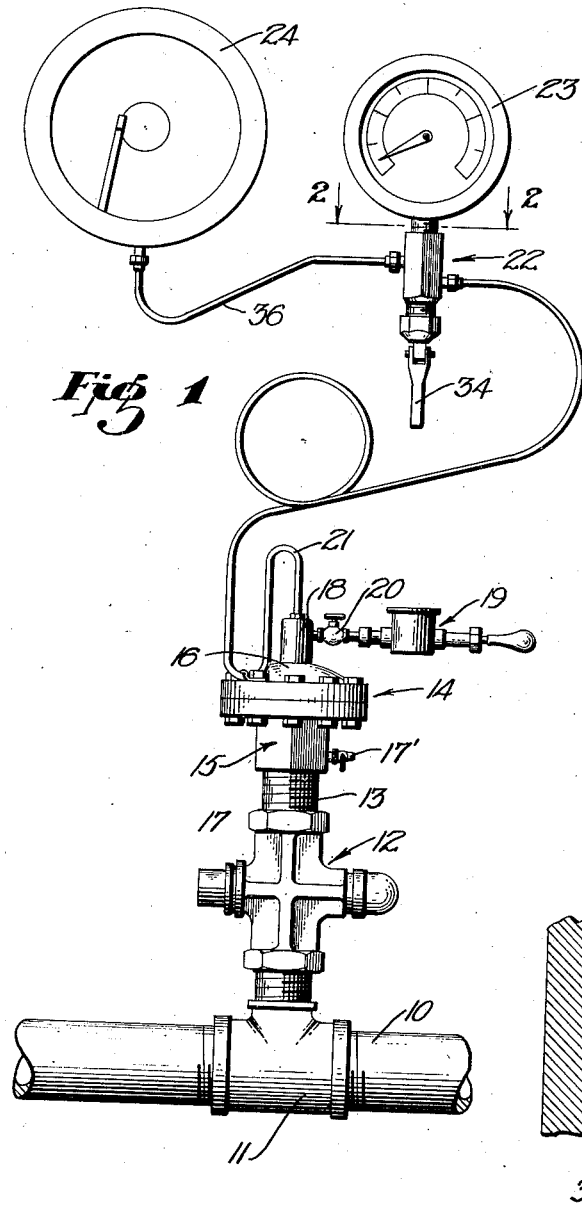
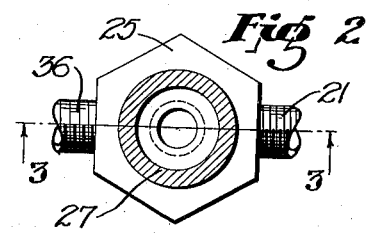
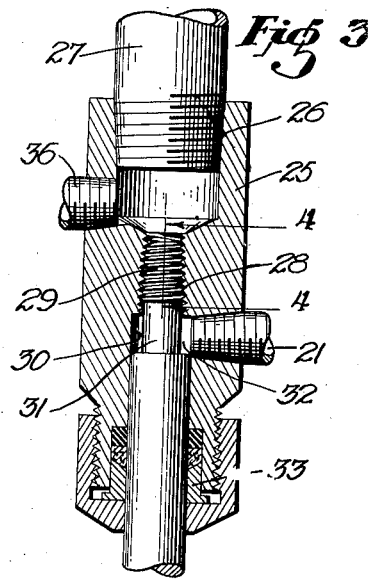
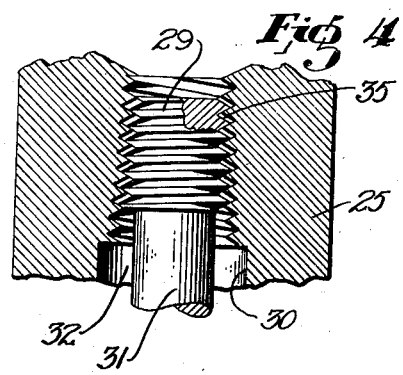
INVENTOR
WALTER R. MARTIN
BY
James M. Abbett
ATTORNEY Patented Aug. 31, 1937

2,091,764

UNITED STATES PATENT OFFICE 2,091,764

PRESSURE DAMPENER

Walter R. Martin, Long Beach, Calif., assignor to Martin-Decker Corporation, Long Beach, Calif., a corporation of Delaware Original application January 23, 1931, Serial No. 510,642, now Patent No. 2,037,425, dated April 14, 1936. Divided and this application March 17, 1936, Serial No. 69,347

3 Claims. (Cl. 138—43)

This invention relates to means for measuring and controlling pressures and particularly pertains to means for determining pulsating pressures, and is a division of my co-pending application, Serial No. 510,642, filed January 23, 1931 entitled, Means for measuring fluid pressures, now Patent No. 2,037,425 of Apr. 14, 1936.

In drilling oil wells operating pressures under severely pulsating service are often encountered in pumping corrosive, abrasive, and contaminating fluids, such as the mud used in drilling oil wells. This mud is circulated through the drill pipe to and around the bit and then returns to the surface through the well bore. It is essential at many times to maintain rapid circulation of this fluid and consequently the pumps labor at high speeds while creating severe pulsation conditions. The fluid used in these operations is highly abrasive and contaminating and will clog rapidly and harden quickly upon exposure to air. In fact, it may even clog at times merely upon a reduction of velocity. The extremely high pressures under which this fluid is pumped also necessitates extraordinary precautions to prevent leakage of the contaminating liquid into the gauge system under normal as well as adverse conditions.

It is highly desirable to maintain an accurate record of pumping pressures and constantly be able to ascertain them. Since such indications will show many things, including among others when a drill bit is plugged and when the threaded connections of the drill pipe are cutting out as well as indicate when the cuttings have settled around the bit and when the bit has worn out of gauge and is drilling an undersize hole.

A particular object of the present invention is to combine means for measuring the pressure of the mud fluid and by provision of safety features to prevent the possibility of mud reaching these gauges even under the adverse operating conditions usually encountered. It is also desirable to protect the tubing connections, gauge fluid system, and sealing means against the force of severe pulsations of high pressure and mud pump operation. Another object of this present invention is to provide a sealing unit in which such safety features are incorporated and in conjunction therewith a dampening unit which may be made effective to eliminate the pulsations of the gauge fluid system, regardless of conditions of pressure, temperature, or pulsation, the structure being so designed as to eliminate vibration in the gauge system which would become leaky due to the pulsating pressure and thereby render the device inaccurate or inoperative.

The invention is illustrated by way of example in the accompanying drawing, in which:

Fig. 1 is a fragmentary view in side elevation showing the complete apparatus with which the invention is concerned.

Fig. 2 is a view in section through a choke valve as seen on the line 2—2 of Fig. 1.

Fig. 3 is a view in longitudinal section through the choke valve as seen on the line 3—3 of Fig. 2.

Fig. 4 is an enlarged fragmentary view of the threaded valve portion of the choke valve as seen on the line 4—4 of Fig. 3.

Referring more particularly to the drawing, 10 indicates a pipe through which mud is circulated in well drilling operations. This pipe is shown in Fig. 1 as being fitted with a T 11 to which the cutoff valve 12 is connected. The valve 12 is also fitted with a connection to a pipe 13 which leads to a substantially vertical mounted diaphragm cage indicated at 14 and of the type more particularly shown and described in my co-pending application, entitled, Means for measuring fluid pressure, Serial No. 510,642, filed January 23, 1931. This cage comprises a lower casting 15 and an upper casting 16 fitted with complementary bolt flanges by which the two castings are secured together. The lower casing 15 is formed with a downwardly extending tubular portion 17 to receive the pipe 13. The upper casting 16 is formed with a central cylindrical portion 18 having a central bore therein. A drain valve 17' is connected with the tubular portion 17 of the lower diaphragm cage casting 15. The drain valve enters the tubular portion about intermediate its length. It is opened occasionally during use to insure that the chamber below the diaphragm is filled with fluid material, to drain off oil or to release excessive quantities of air or gas which may become trapped there due to the vertical position of the diaphragm cage. When the valve 12 is closed for adjustments or filling the drain valve 17' is opened to release the pressure beneath the diaphragm cage so that connections may be broken or the system filled.

A pump structure 19 is connected with the central bore of the central cylindrical portion 27 of the casting 16 through a pet cock 20. After initial insulation or upon leakage of fluid this pump is used to fill the tubing gauges and the space in the diaphragm cage above the diaphragm with balancing fluid. The central bore formed with the cylindrical portion 18 of the casting 16 communicates with a pressure tube 21 leading to a choke valve structure 22 with which the present invention is particularly concerned. This structure regulates and dampens the fluid flow to an indicator 23 and a recording device 24 as will be hereinafter described.

The choke valve structure is shown in detail in Figs. 2 to 4 inclusive, where it will be seen that it comprises a housing 25 having a relatively large threaded opening 26 at its upper end to receive a pipe 27 connecting it with an indicator 23. At the lower end of the opening 26 is a passageway 28 which is formed with a burnished tapered internal thread to receive a threaded choke plug 29 which cooperates with the longitudinally extending threaded bore 28 to provide a choke valve.

A passageway 30 is formed in longitudinal alinement with the large passageway 26 and the threaded bore 28. This passageway receives the stem 31 of the choke plug 29. The stem 31 is reduced in diameter at its threaded end forming an annular passageway 32 around which fluid may flow from the pressure tube 21. A stuffing gland 33 is formed at the end of the valve housing and accommodates the stem 31. An operating lever 34 is secure at the end of the valve stem and provides a convenient means for its rotation.

The choke valve operates to permit fluid to pass around and along the tapered threads of the choke plug 29 and the complementary bore 28. This passageway is indicated at 35 in Fig. 4. It will thus be evident that as the valve 29 is screwed into position the sectional area of the spaces 35 will decrease in microscopic proportions so that the volume of fluid flowing to the indicator 23 and the recording device 24 may be regulated to a nicety. The recording device 24 is connected with a valve structure 22 by a tube 36.

In operation of the present invention the structure is assembled as shown in the drawings and attached to a pipe 10 through which fluid flows under pressure. The tubing, gauges, and the upper portion of the diaphragm cage are filled with fluid through the pump 19, and the pet cock 20 is then closed. Air in the system is bled off by loosening the connections at the high points in the system so that the system is completely filled with balancing fluid. The fluid used is generally water; water alcohol or water-glycerine mixture where protection against freezing is desired. Preferably the fluid will be such that the viscosity will be low and will remain substantially constant within normal atmospheric temperature ranges. This, though desirable, is not necessary due to the adjusting feature of the choke valve 22. Should the diaphragm cage become clogged leakage of the fluid will take place and the cage pressure will drop indicating to the operator that such is the condition. He may then check the leakage, refill the system and proceed as before. The fluid of which the pressure is to be measured will act against the lower face of the diaphragm of the diaphragm cage 14. The diaphragm will in turn act against the fluid in the upper portion of the diaphragm cage to force it through the pipe 21 and into the choke valve 22. The speed of pressure transfer from the pipe 21 to the gauges may be accurately regulated by the choke valve structure 22 as previously described. Properly regulated the choke valve structure 22 will limit the pulsation through the system and prevent rapid vibration of the diaphragm as well as of the gauges. Due to the extreme fluctuations of pressure in such systems it has been very difficult to obtain diaphragm materials which will withstand such service for any length of time. By the interposition of this choke valve 22 between the diaphragm and the gauges an effective protector is introduced for both units. The transfer of fluid to the gauges to cause them to expand is reduced in its speed to such as will cause a uniform non-pulsating movement of registry regardless of the rapidity and force of the external pulsations. Due to the extremely small size of its passage the choke valve structure likewise provides an effective secondary seal against foreign matters or mud entering the gauge elements proper. Such foreign matter would, of course, obstruct the passage and cause the gauges to register improperly. However, such inoperativeness of the gauges will be apparent and with the valve 12 closed, and the pressure bled off through the drain 17' the stuffing gland 33, and the threaded choke plug 29 will be completely removed, cleaned and the passages 28 and 29 cleaned out to remove the obstruction. Reassembling and refilling of the system and opening of the valve 12 will again place the gauges in operation with the minimum loss of time.

Attention is directed to the fact that an indicating device of the present type and varying factors of operation under varying pressure conditions the choke valve structure here used makes it possible to instantly and accurately regulate the apparatus to meet these requirements. It will thus be seen that the device herewith disclosed provides means for accurately measuring the pressure of a fluid flowing in a pipe irrespective of whether that pressure is constant or pulsating and to directly indicate and record the pressure of a flowing fluid.

While I have shown the perfected form of my invention as now known to me it will be understood that various changes may be made in combination, construction, and arrangement of parts by those skilled in the art without departing from the spirit of my invention as claimed.

Having thus described my invention, what I claim and desire to secure by Letters Patent is:—

1. In a device of the character described, a choke valve comprising an outer housing, a longitudinal bore being formed therethrough, a reduced longitudinally tapered threaded section in the length of said bore, a fluid communicating passageway at one end of the threaded section, a fluid communicating passageway at the opposite end of the threaded section and a threaded valve member extending longitudinally of the bore and fitting into the threaded section thereof whereby rotation of the threaded valve member within the complementary threaded bore will vary the space of the fluid passageway occurring between the faces of the threads and will control the flow of fluid through the housing from one passageway to the other, the valve stem being reduced in diameter at its inner threaded end and adjacent of the fluid passageways through the housing whereby the passageway along the threads of the valve screw will have free access to said passageway through the housing.

2. In a device of the character described, a choke valve comprising an outer housing, a longitudinal bore being formed therethrough, a reduced longitudinally tapered threaded section in the length of said bore, a fluid communication passageway at one end of the threaded section, a fluid communicating passageway at the opposite end of the threaded section and a threaded valve member extending longitudinally of the bore and fitting into the threaded section thereof whereby rotation of the threaded valve member within the complementary threaded bore will vary the space of the fluid passageway occurring between the faces of the threads and will control the flow of fluid through the housing from one passageway to the other, the valve stem being reduced in diameter at its inner threaded end and adjacent of the fluid passageways through the housing whereby the passageway along the threads of the valve screw will have free access to said passageway through the housing, and packing means at the end of the valve stem opposite from its threaded portion whereby a fluid seal will be maintained around an end of the valve stem projecting from the housing and by which end it is rotated.

3. A choke valve comprising an outer housing, a longitudinal bore extending for part of the length of the housing and therein, a reduced longitudinally tapered threaded bore forming a continuation of the first named longitudinal bore and communicating with a longitudinally arranged outlet bore, said last named bore being of relatively large diameter for communication with the pressure gauge, a lateral disposed bore of reduced diameter formed through the wall of the housing to communicate with the last named large diameter bore, a lateral disposed bore of reduced diameter extending through the wall of the housing for communication with the first named bore at a point beyond the threaded bore, a valve element extending into said threaded bore and longitudinally of the housing, the body portion of said element substantially fitting the longitudinal bore, a stuffing gland on the housing and through which said member extends, a reduced end portion formed as a part of said valve element and formed with a tapered thread adapted to fit into the threaded bore of the housing, the threads of the bore of the threaded element being different in width whereby adjustment of the valve stem will vary the effective passageway of fluid along and around the thread from the first named longitudinal bore to the last named longitudinal bore.

WALTER R. MARTIN.